United States Patent [19]

Forman et al.

[11] 4,112,369
[45] Sep. 5, 1978

[54] SECURE SCA BROADCASTING SYSTEM INCLUDING SUBSCRIBER ACTUATED PORTABLE RECEIVING TERMINALS

[75] Inventors: Aubry S. Forman, Toledo, Ohio; Charles A. Schultz; John F. Schultz, both of Gainesville, Fla.

[73] Assignee: Digital Data, Inc., Toledo, Ohio

[21] Appl. No.: 675,504

[22] Filed: Apr. 9, 1976

[51] Int. Cl.$^2$ ............................................. H04K 1/00
[52] U.S. Cl. ........................................ 325/34; 325/32; 340/152 R
[58] Field of Search .......................... 325/34, 32, 346; 340/152 R, 154; 179/1 GQ, 15 BT, 15 BM, 18 BF

[56] References Cited

U.S. PATENT DOCUMENTS

| | | | |
|---|---|---|---|
| 2,840,815 | 6/1958 | Andres et al. | 179/15 BM |
| 3,113,294 | 12/1963 | Parker | 340/154 |
| 3,257,644 | 6/1966 | Moore | 340/152 R |
| 3,299,210 | 1/1967 | Bawdy | 340/152 R |
| 3,337,691 | 8/1967 | Litchman | 179/15 BM |
| 3,387,268 | 6/1968 | Epstein | 340/152 R |
| 3,478,169 | 11/1969 | Saito | 179/15 BT |
| 3,499,995 | 3/1970 | Clark | 179/15 BM |
| 3,679,832 | 7/1972 | Halpern | 179/15 BT |
| 3,723,890 | 3/1973 | Hutsinger | 325/346 |
| 3,899,772 | 8/1975 | Mead et al. | 340/152 R |

Primary Examiner—Samuel W. Engle
Assistant Examiner—S. A. Cangialosi
Attorney, Agent, or Firm—William J. Clemens

[57] ABSTRACT

A secure information broadcasting system including a central transmitting station for encoding data in binary form utilizing a keyword and transmitting a FM-SCA signal phase shift modulated by the encoded data. Each of a plurality of portable receiving terminals has an identification number stored therein. When a subscriber desires to display the broadcast information on his terminal, he enters a unique password which is combined with the identification number to generate the keyword. The keyword is utilized to decode the received binary data. The portable terminal includes a receiver for decoding the phase shifted FM-SCA signal into the encoded binary data; a keyboard for entering the password, information and display commands; an alphanumeric data display; a processor responsive to the inputs from the receiver and the keyboard for performing selected arithmetic and logic operations to generate output data to the data display and a bus connecting the circuits of the portable terminal for parallel signal flow.

8 Claims, 12 Drawing Figures

PORTABLE TERMINAL

SECURE SCA BROADCASTING SYSTEM INCLUDING SUBSCRIBER ACTUATED PORTABLE RECEIVING TERMINALS

BACKGROUND OF THE INVENTION

1. Field of the Invention

The present invention relates to a secure FM-SCA broadcasting system having a central transmitting station for transmitting encoded data and subscriber actuated portable receiving terminals for decoding and displaying the data.

2. Description of the Prior Art

One of the problems associated with the buying and selling of securities and commodities has been satisfying the need for current information at locations remote from the various exhanges and other trading places. An initial solution by the stock brokerage houses was the direct display of information provided via teletype by the various exhanges. However, such a display either required a customer to visit his brokerage house or to phone his stockbroker and request that one or more stocks be watched. Since the information was transmitted and received in serial form, either method of obtaining the information required the expenditure of much time on the part of the person observing the display.

A subsequent solution was the development of a quotation terminal and high speed transmission of the data from a central data processing and storage unit. The terminal user, typically the stockbroker, could request information on a particular stock for immediate display. Still, there was the necessity to either call the stockbroker for current information or visit the brokerage house where the customer had access to the terminal. However, since most customers were reluctant to call the stockbroker where they were not contemplating a transaction and did not have the time available for frequent trips to the brokerage house, they did without the information. Such inaction tended to stifle transactions.

The difficulty in obtaining information and the high cost of a quotation terminal for an individual customer led to the development of a less expensive personal data terminal. One form of such a terminal is shown in U.S. Pat. No. 3,716,835 issued on Feb. 13, 1973. A data processor receives stock market information via teletype lines or other high speed lines and stores the data in a memory. A personal quotation terminal is connected to the data processor by telephone lines for bidirectional communication. The terminal includes an acoustic coupler for a telephone handset, a keyboard for entering address and control signals, and display means. The customer dials the telephone number of the data processor and when connected places the handset in contact with the acoustic coupler. The customer then enters the address of the desired stock information which is sent to the data processor over the telephone line. The data processor sends the current information through the telephone line to the terminal where it is displayed. However, such a system has the disadvantages of requiring that a telephone be available and that the data processor not be busy with inquiries from other customers. Potentially, a few customers could tie up all the telephone input lines by leaving their terminals connected to the data processor although they were not requesting information.

An alternate form of a personal quotation terminal which solves many of the problems associated with the telephone coupled system is shown in U.S. Pat. No. 3,611,294. The stock data is processed, encoded and transmitted by a modulated carrier wave. A plurality of portable receivers each separate the data from the carrier wave and compare a portion of the data representing a stock identification code with the code entered by the customer. If the codes are the same, the data is displayed. The terminal may be utilized on a subscription basis where a subscriber is provided with a punched card to be inserted into a translator. A stock code is set on a plurality of code wheels which cooperate with the translator to establish an identification code for the stock. However, since the terminal cannot be operated without the card, it is vunerable inoperation due to misplaced, lost or forgotten cards. Furthermore, a borrowed or stolen card permits unauthorized use and it is relatively easy to discover the card code for a new pay period by observing the transmitted data in the old and new pay periods and knowing card code for the old pay period.

SUMMARY OF THE INVENTION

The information broadcasting system according to the present invention includes a central transmitting station which receives data to be transmitted from one or more data sources. A data encoder which includes a digital computer encodes the data in binary form utilizing a keyword. Then the encoded binary data is utilized to phase shift modulate a FM-SCA carrier wave at three times the stereo pilot frequency.

A portable receiver terminal includes a tuned FM receiver for separating the phase shifted modulation signal, converting it to binary data and decoding the binary data into the encoded binary data generated by the computer at the central transmitting station. The stereo pilot signal is utilized to synchronize the decoding of the data.

The portable terminal also includes a keyboard for entering a password, information or command signals requesting the display of data. An identification number is stored in the terminal and is utilized with a password unique to the subscriber and the pay period to generate the keyword used by the computer to encode the data. The terminal utilizes the keyword to decode the received data which can be stored for future use or displayed. The terminal includes a four element star pattern alpha-numeric display for a visual output of the desired data.

The receiver, the keyboard and the display are all connected to a bus through individual interface circuits. Also connected to the bus is a microprocessor, a random access memory (RAM) and one or more read only memories (ROM). The microprocessor performs arithmetic and logic operations under the direction of a plurality of program instructions stored in the ROM's. One group of instructions defines a "Background Monitor" routine which directs the microprocessor through a main loop searching for information stored in a buffer in the RAM. Such information may include input data from the receiver, an input from the keyboard or data to be displayed. Inputs from the keyboard and the receiver cause the microprocessor to interrupt the main loop and proceed through separate routines to identify and store the input information in the RAM before returning to the routine. If there is data to be displayed, the microprocessor is directed through a display routine and then returned to the main loop.

The data terminal can be secured against unauthorized use through an encoding scheme. In one form of the scheme, a sixteen bit identification number is exclusive-OR'ed with the unique password entered through the keyboard to generate the keyword. The keyword is then exclusive-OR'ed with the incoming data to decode it. The microprocessor rotates the keyword by one bit for each incoming data word so that the encoding scheme is relatively difficult to break.

In another encoding scheme, the password is utilized to seed a random number generator which will always generate the same random number for the same seed number. The random number and the identification number are exclusive-OR'ed to generate the keyword. The keyword is exclusive-OR'ed with the incoming data to decode the first data word in a group. The first data word is used to seed the random number generator to obtain a random number which is exclusive-OR'ed with the remaining incoming data to decode it. Since the random number generator repeats every 16,000,000 numbers and the seed value can be changed at any time, the incoming data appears as a continuous stream of random bits and is virtually impossible to break.

It is an object of the present invention to provide a secure information broadcasting system accessible by subscriber actuated portable receiving terminals.

It is another object of the present invention to provide a relatively inexpensive, easily portable information receiving and display terminal.

It is a further object of the present invention to provide an information broadcasting system in which data to be displayed is selected from a continuously transmitted stream of current data.

DESCRIPTION OF THE PREFERRED EMBODIMENT

Figure 1:
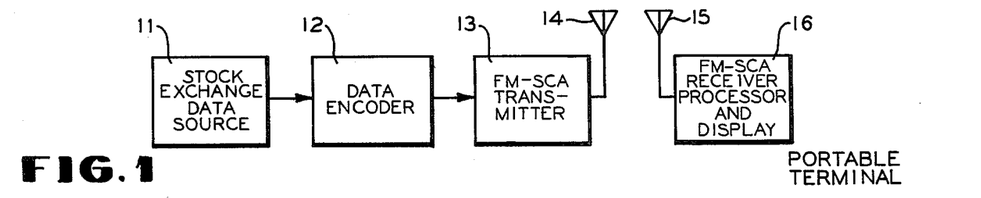
FIG. 1 is a block diagram of a central broadcasting station and a portable receiving terminal according to the present invention.

Referring to FIG. 1, there is shown a block diagram of a central broadcasting station and a single portable receiving terminal according to the present invention. The broadcasting station receives data to be transmitted from one or more sources such as a stock exhange data source 11. Source 11 may be any of a number of security exhanges, over-the-counter security dealers or any other source of current information relating to securities. The data from the source is encoded in a data encoder 12. The encoder may be required to convert the data to a binary form, but its primary function is to encode the data so that when the data is transmitted it is secure from unauthorized access and use of the portable terminal is limited to prepaid subscribers.

The encoded data is utilized to frequency modulate a carrier wave in a FM-SCA transmitter 13 and the modulated carrier wave is transmitted by means of an antenna 14. At the portable terminal, the modulated carrier is received by an antenna 15 connected to a FM-SCA receiver 16. The receiver 16 demodulates the signal to obtain the encoded data. The receiver 16 also includes a processor for processing the data and a display for a visual output of selected portions of the data.

Figure 2:
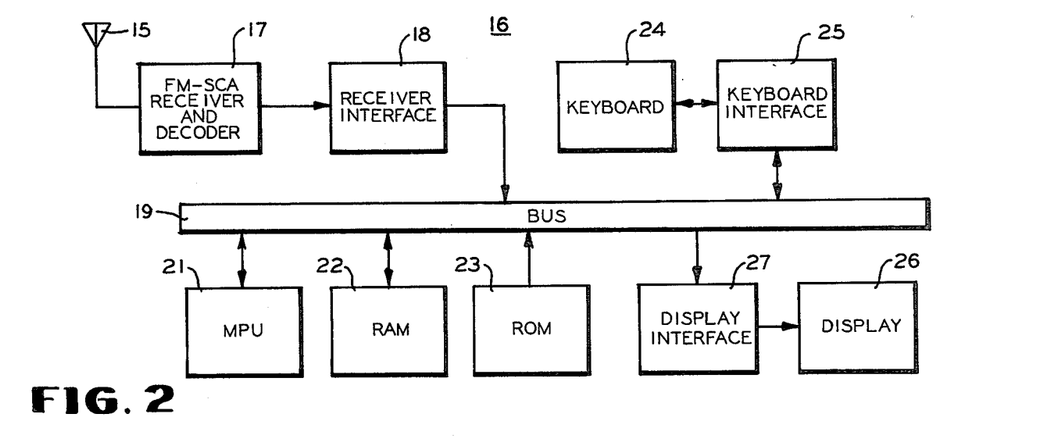
FIG. 2 is a more detailed block diagram of the portable terminal of FIG. 1.

Referring to FIG. 2, there is shown a more detailed block diagram of the portable terminal of FIG. 1. The antenna 15 is connected to a FM-SCA receiver and decoder 17 which demodulates the modulated carrier to obtain the encoded data. Then the encoded data is sent along with a clock signal obtained from the stereo pilot signal to a receiver interface circuit 18. The circuit 18 is connected to a bus 19 which connects the various circuits of the portable terminal together for the transfer of data, address and control signals.

The processor portion of the receiver, processor and display 16 includes a microprocessor (MPU) 21, a random access memory (RAM) 22 and one or more read only memories (ROM) 23. In terms of data transfer, the MPU 21 and the RAM 22 can receive data from and send data to other circuits connected to the bus 19 whereas the ROM 23 can only send data to other circuits connected to the bus. A keyboard 24 is provided for requesting data to be displayed. The keyboard 24 is connected to the bus 19 through a keyboard interface 25. Keys which are depressed are sensed through the interchange of signals between the keyboard 24 and the MPU 21.

The display portion of the receiver, processor and display 16 includes a display circuit 26 which is connected to the bus 19 by a display interface circuit 27. The MPU 21 responds to the signals generated by the depressed keys of the keyboard 24 to process data from the receiver and decoder 17 and generate output data to the display 26.

Figure 3:
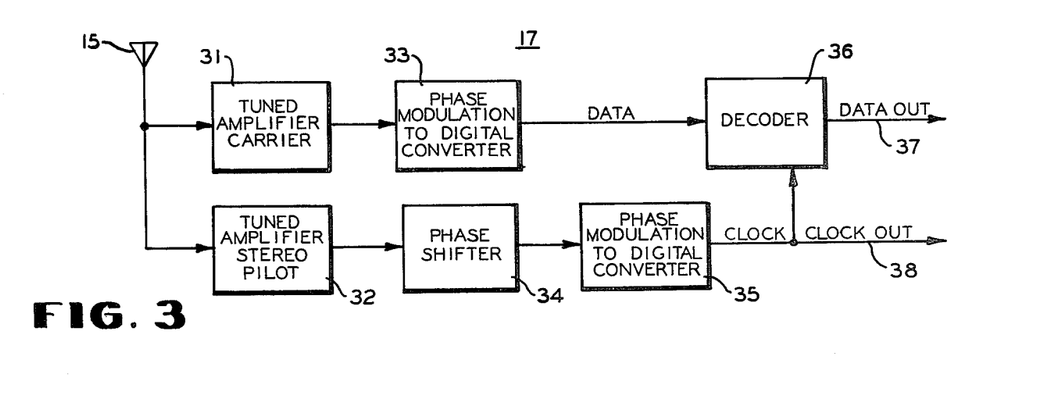
FIG. 3 is a block diagram of the FM-SCA receiver and decoder of FIG. 2.

A more detailed block diagram of the FM-SCA receiver and decoder 17 of FIG. 2 is shown in FIG. 3. The antenna 15 is connected to the inputs to a pair of tuned amplifiers, a tuned amplifier 31 for the modulated carrier signal and a tuned amplifier 32 for the stereo pilot signal. The data was encoded by the data encoder 12 and used to phase shift modulate the carrier at three times the stereo pilot frequency. Typically, the frequency of the stereo pilot signal is 19 KHz which results in a 57 KHz center frequency for the phase modulated signal. The tuned amplifier 31 may be a conventional circuit for separating the 57 KHz signal from the other components of the FM signal. A phase modulation to digital converter circuit 33 shapes the 57 KHz signal to generate the encoded data at definable logic levels. Throughout this description a negative or low logic level will be represented by a "0" and a positive or high logic level will be represented by a "1".

In a similar manner, the tuned amplifier 32 separates the stereo pilot signal from the other components of the FM signal. The stereo pilot signal is utilized as a clock signal to synchronize the decoding of the data with the encoding of the data at the broadcast station. A phase shifter circuit 34 provides for phase shifting of the stereo pilot signal with respect to the 57 KHz data signal to obtain coincidence between the sampling time and the group of logic signals to be sampled. A phase modulation to digital converter circuit 35 shapes the 19 KHz signal to generate a train of clock pulses at definable logic levels. The data signals and the clock signals are applied to a decoder circuit 36. The data out signal from the decoder 36 will be a logic signal which reflects the state of the data signal at a "0" to "1" transition of the clock signal. The data out and clock out signals are sent to the receiver interface circuit 18 of FIG. 2.

Figure 4:
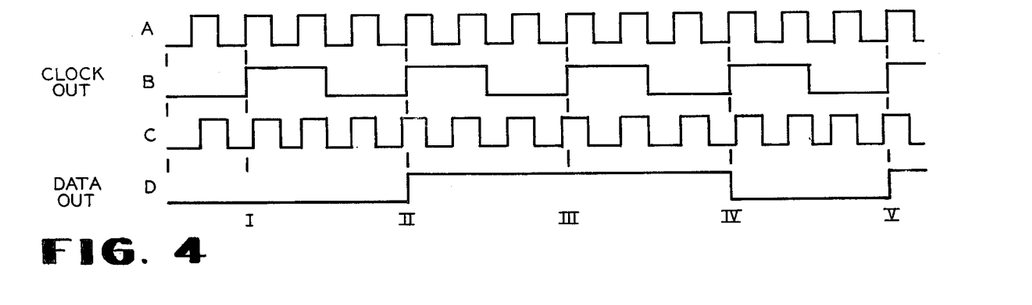
FIG. 4 shows a set of wave forms for signals generated in the circuit of FIG. 3.

The decoder 36 can be a conventional D-type flip flop having a noninverting output which generates a logic signal reflecting the state of a logic signal at a data input when there is a "0" to "1" transition at a clock input. In FIG. 3, the data signal is supplied to the data input, the clock signal is supplied to the clock input and the data out signal is generated at the noninverting output. There are shown in FIG. 4 various pulse trains associated with the decoder 36. A wave form "A" represents the unmodulated 57 KHz data signal from the converter 33 while a wave form "B" represents the 19 KHz stereo pilot signal. The phase shifter of 34 can be utilized to shift the wave form "B" to a time referenced position relative to the wave form "A" wherein the leading edge of each "1" pulse of the "A" wave form coincides with the leading edge of a corresponding one of every third "1" pulse of the "B" wave form. When data is encoded at the broadcasting station, the wave form "B" is modulated by phase shifting as shown in a wave form "C". The "0" to "1" transistion of every third pulse of wave form "C" takes place either before or after the corresponding transistions in the "B" wave form.

When the wave form "A" is received at the data input of the flip flop, the input signal will be at the same logic level each time a "1" clock pulse clocks the flip flop. With the relationship shown in FIG. 4, the flip flop data out signal will be maintained at "0" since the wave form "A" is always at "0" before the "1" pulse of the clock signal occurs. However, a phase shifted data signal will generate changes in the data out signal. In FIG. 4, a wave form "D" represents the data out signal for the data signal wave form "C" and the clock signal wave form "B". Assume that the previous sample had generated a "0" from the flip flop. At time I another sample is taken and, since the wave form "C" is at "0", the output data signal "D" will remain at "0". At time II another sample is taken and the wave form "C" has been shifted to be at "1" so that the data out signal "D" changes to "1". Other samples at times III, IV and V generate a series of "0" and "1" pulses, one for each sample period, which represent serial data decoded from the phase modulated 57 KHz signal. The data out signal and the clock out signals are generated on a pair of lines 37 and 38 respectively to the receiver interface circuit 18 which is shown in FIG. 5.

Figure 5:
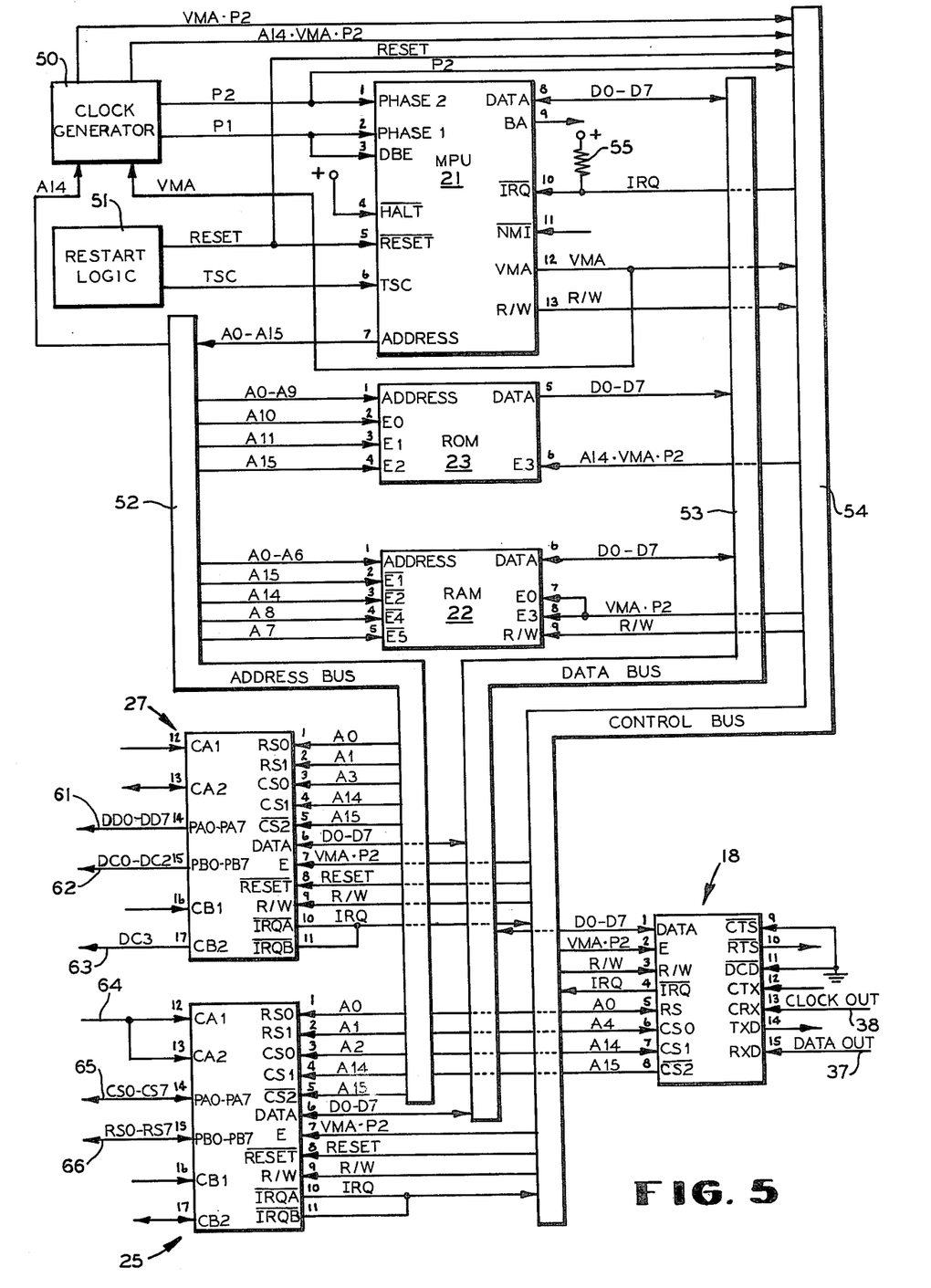
FIG. 5 is a block diagram of the microprocessor, memories and interface circuits of FIG. 2.
Figure 6:
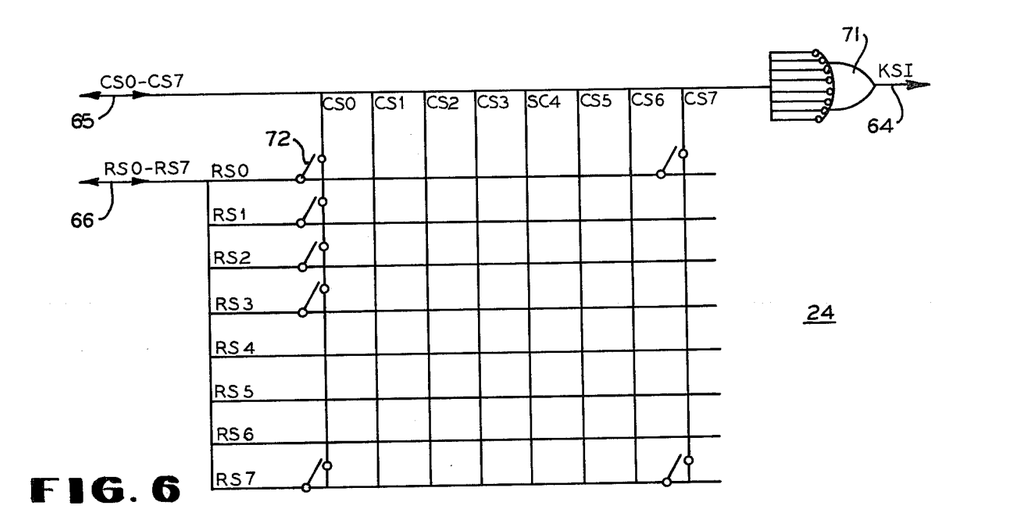
FIG. 6 is a schematic diagram of the keyboard circuit of FIG. 2.
Figure 7:
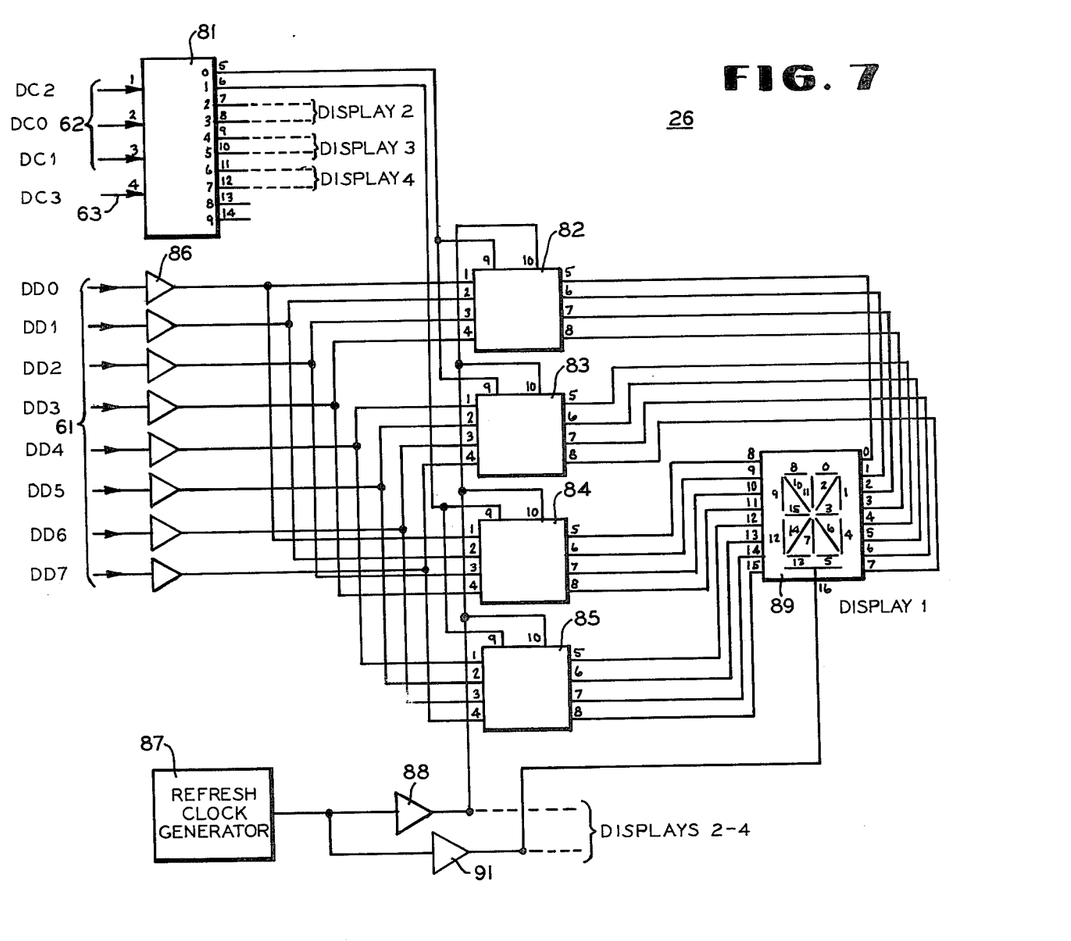
FIG. 7 is a part block diagram, part schematic of the display circuit of FIG. 2.

Referring to FIG. 5, there is shown a block diagram of the microprocessor, memories and peripheral devices which input data, perform various data processing functions and generate output data and control signals. In FIGS. 5 through 7 each circuit element having more than two terminals will have those terminals designated by the element reference numeral and a terminal number separated by a hyphen such as a terminal 21-1 of the microprocessor (MPU) 21.

The microprocessor is a model S6800 manufactured by American Microsystems, Inc. (AMI) of 3800 Homestead Rd., Santa Clara, Calif. 95051. The MPU 21 features eight bit parallel processing under the direction of seventy-two different instructions. There are six internal registers for the temporary storage of data-two accumulators, an index register, a program counter, a stack pointer and a condition code register. The MPU is also available from Motorola, Box 20912, Phoenix, Ariz. 85036.

A pair of clock inputs 21-1 and 21-2 receive the P1 and P2 clock signals respectively from a clock generator 50. The clock signals are non-overlapping square wave pulse trains of the same frequency which are utilized to generate all the timing for the elements of FIG. 5. A data bus enable (DBE) input 21-3 is a three state control for the microprocessor internal data bus. When the DBE input 21-3 is at "1", the bus drivers are enabled and data can be transferred between the microprocessor internal circuits and/or the data bus outputs. During a microprocessor read cycle, where external data is read into the microprocessor, the data bus drivers are disabled internally. When the signal at the DBE input 21-3 is at "0", the bus drivers will be set in a high impedance state which will neither sink nor source current at a discernable logic level so that a peripheral device can control the data bus.

A $\overline{\text{HALT}}$ input 21-4 is connected to a positive potential direct current power supply (not shown) to maintain the microprocessor in the "on" state. If this input were at "0", all activity would stop at the end of an instruction. A bus available (BA) output 21-9 would be at "1", a valid memory address (VMA) output 21-12 would be at "0" and all other three state terminals such as the address outputs and the read/write output would be in the "off" or high impedance mode. A $\overline{\text{RESET}}$ input 21-5 is connected to a restart logic circuit 51 which normally generates a "1". This input is utilized to reset and start the microprocessor from a power down condition resulting from a power failure or an initial start-up of the processor. If a "0" to "1" transition is detected, the microprocessor will begin the restart sequence which will execute a routine to initialize the microprocessor from its reset condition. All of the higher order address lines will be forced high. The last two (FFFE and FFFF) locations in the external memory will be used to load the program that is addressed by the program counter. During the restart routine, the interrupt mask bit is set and must be reset before the microprocessor can be interrupted by a signal at the $\overline{\text{IRQ}}$ input. The signal at the $\overline{\text{RESET}}$ input 21-5 must be "0" for at least eight clock signal periods after the power supply potential reaches a predetermined magnitude, typically 4.75 volts. If the RESET signal goes to "1" prior to a leading edge of the P2 clock signal, on the next P1 leading edge the first restart memory vector address (FFFE) will appear on the address lines as the higher order eight bits to be stored in the program counter. Next, the second address (FFFF) which contains the lower eight bits is stored in the program counter. These address bits are the address of the program to be executed.

A three state control (TSC) input 21-6 normally receives a "0" from the restart logic circuit 51. When the TSC input is at "1", the address lines and the read/write line will be set to the "off" or high impedance state while the valid memory address (VMA) and bus available (BA) output signals are set to "0". The address bus is then available for other devices to directly address the memory. Since the microprocessor is a dynamic device, it can be held in this state for only 5.0 microseconds or the data in the microprocessor will be destroyed. A group of sixteen address terminals 21-7 are connected to sixteen parallel lines (not shown) which comprise an address bus 52. These terminals are the outputs of three state bus drivers which are turned off when it is desired that devices other than the microprocessor address the memory.

A group of eight data terminals 21-8 are connected to eight parallel lines (not shown) which comprise a data bus 53. These terminals are bidirectional for transferring data to and from the memory and peripheral devices. The data terminals are the outputs of three state bus drivers which can be turned off for direct memory access applications by a "0" at the DBE input 21-3. The bus available (BA) output 21-9 is normally in the "0" state. However, if a "0" is placed at the $\overline{\text{HALT}}$ input 21-4 or the microprocessor is in a WAIT state as a result of the execution of a WAIT instruction, a "1" will be generated to indicate that the address bus is available. The BA output is not connected in this circuit since none of the devices other than the MPU needs to generate address signals.

An interrupt request ($\overline{\text{IRQ}}$) input 21-10 is connected to a control bus 54 and to a positive polarity direct current power supply (not shown) through a resistor 55. The IRQ interrupt request signal is normally at "1". However, when a peripheral device requests an interrupt, the IRQ signal goes to "0" if the HALT signal is "1". The microprocessor responds by completing the current instruction and then performing an interrupt sequence. The sequence is generally performed when a complete data character has been assembled by the receiver interface circuit 18 or a key strike is detected by the keyboard interface circuit 25. The $\overline{\text{IRQ}}$ input has a high impedance pullup device internal to the circuit but the manufacturer recommends that an external resistor, such as the resistor 55, to a supply voltage be utilized for wire-OR operation and optimum control of interrupts. A non-maskable interrupt ($\overline{\text{NMI}}$) input 21-11 is provided wherein a "0" input signal requests a non-mask interrupt sequence by generated within the microprocesssor. This feature is not utilized in the circuit of FIG. 5 and therefore the input 21-11 is not connected. Both of the inputs $\overline{\text{IRQ}}$ 21-10 and $\overline{\text{NMI}}$ 21-11 are hardware interrupt inputs that are acknowledged by the microprocessor during the "1" state of the P2 clock signal and will start the interrupt routine on the next "1" state of the P1 clock signal after the completion of an instruction. The microprocessor 21 can be removed from a WAIT state by the occurrence of an interrupt signal.

The valid memory address (VMA) output 21-12 is connected to the control bus 54. A "1" at this output indicates to peripheral devices that there is a valid memory address on the address bus so that the addressed device is enabled. A read/write (R/W) output 21-13 is also connected to the control bus 54. A "1" at this output signals peripheral devices that the microprocessor is in a read state and a "0" signals that the microprocessor is in a write state. If the microprocessor is halted or the TSC signal is "1", the R/W output will be in an off or high impedance state.

The ROM 23 is a model S6830 AMI mask programmable read only memory organized into 1024 eight-bit words which are directly addressable. The ROM 23 is representative of a plurality of such devices (not shown) which are utilized to store program instructions and data necessary for the operation of the portable terminal. A plurality of address inputs 23-1 are connected to the address bus 52 for receiving the A0 through A9 address signals generated by the microprocessor 21. The address signals represent 1024 different binary coded ten bit addresses, one for each word in the memory.

The ROM 23 also includes four mask programmable enable inputs. They are an E0 input 23-2 connected to the address bus for receiving the A10 address bit, and E1 input 23-3 connected for receiving the A11 address bit, an E2 input 23-4 connected for receiving the A15 address bit and an E3 input 23-6 connected to the control bus for receiving an enable signal A14·VMA·P2 from the clock generator 50. Each enable input can be mask programmed to respond to a "0" or a "1" signal so that up to sixteen ROM's can be individually enabled by the combinations of the same four signals. The clock generator 50 is connected to the microprocessor output 21-12 to receive the VMA signal and to the address bus 52 to receive the A14 signal. When the A14, VMA and P2 signals are all at "1", the A14·VMA·P2 signal is at "1" and when any other combination of those three signals occurs, the A14·VMA·P2 signal is at "0".

When the ROM 23 is addressed and enabled, the word selected by the address is outputted. The ROM 23 has eight data outputs 23-5 which are connected to the data bus 53. The stored word is generated onto the data bus as the D0 through D7 data signals. When the ROM 23 is not enabled, the data outputs are in the off or high impedance state.

The RAM 22 is a model S6810 AMI read/write memory organized into 128 eight-bit words which are directly addressable. A plurality of address inputs 22-1 are connected to the address bus 52 for receiving the A0 through A6 address signals generated by the microprocessor 21. The address signals represent 128 different binary coded seven bit addresses, one for each word in the memory.

The RAM 22 also includes six enable inputs which are: an $\overline{\text{E1}}$ input 22-2 connected to receive the A15 address signal from the address bus 52, an $\overline{\text{E2}}$ input 22-3 connected to receive the A14 address signal, an $\overline{\text{E4}}$ input 22-4 connected to receive the A8 address signal, an $\overline{\text{E5}}$ input 22-5 connected to receive the A7 address signal, an E0 input 22-7 and an E3 input 22-8 connected together to the control bus 54 for receiving an enable signal VMA·P2 from the clock generator 51. When the VMA and P2 signals are both at "1", the VMA·P2 signal is at "1" and when any other combination of those two signals occurs, the VMA·P2 signal is at "0". The RAM 22 is only enabled when the A7, A8, A14 and A15 address signals are at "0" and the VMA·P2 signal is at "1".

The read/write (R/W) signal is also an input to the RAM 22 at a R/W input 22-9. When the R/W signal is at "1" and the RAM is enabled, the RAM will generate the eight-bit word stored in the addressed storage location at eight bidirectional data terminals 22-6 connected to the data bus 53. When the R/W signal is at "0" and the RAM is enabled, the RAM will store at the addressed location the eight-bit word applied to the bidirectional data terminals 22-6. When the RAM 22 is not enabled, the data terminals are in the off or high impedance state. Therefore, the RAM 22 can be utilized for the temporary storage of data while the microprocessor 21 is processing other data.

Also connected to the address bus 52, the data bus 53 and the control bus 54 are the receiver interface circuit 18, the keyboard interface circuit 25 and the display interface circuit 27. The interface 18 is a model S6850 AMI asynchronous communication interface adapter which provides the data formatting and control necessary to interface serial data communications to the parallel data bus organized microprocessor and memories.

The interface 18 includes eight bidirectional data terminals 18-1 which are connected to the data bus 53 for sending and receiving the data signals D0 through D7. The terminals will remain in the high impedance state until an enable signal is received at an E enable input 18-2 and a read signal is received at a read/write (R/W) input 18-3 at which time incoming data can be read from the data terminals. The interface enable input 18-2 is connected to the control bus 54 to receive the VAM·P2="1" signal which is generated by the clock generator 51 to enable the data terminal input/output drivers and also enable the RAM 22. The interface R/W input 18-3 is connected to the control bus 53 to receive the R/W signal generated by the microprocessor 21. When R/W="1" and the interface 18 is enabled at 18-2, the data terminal output drivers are turned on and the contents of an internal read only register are placed at the data terminals 18-1. If R/W="0" and the interface 18 is enabled at 18-2, the microprocessor can write into an internal write only register but this feature is not utilized in this system.

An interrupt request output ($\overline{\text{IRQ}}$) 18-4 is connected to the control bus 54. When an interrupt enable is set within the interface 18, an IRQ="0" interrupt request signal is generated through the control bus 54 to the interrupt request input 21-10 of the microprocessor. A register select input (RS) 18-5 is connected to the address bus 52 to receive the A0 address signal. When A0="1", the transmit/receive data pair of registers in the interface 18 is selected. The read only register is selected when R/W="1" and the write only register is selected when R/W="0". When A0="0", the control/status pair of registers is selected but this operation is not utilized in this system.

A chip select input (CS0) 18-6 is connected to the address bus 52 to receive the A4 address signal, a chip select input (CS1) 18-7 is connected to receive the A14 address signal and a chip select input ($\overline{\text{CS2}}$) 18-7 is connected to receive the A15 address signal. When A4 and A14 are at "1" and A15 is at "0", the interface 18 is selected and data transfer is controlled by the VMA·P2, R/W and A0 signals.

A clear-to-send input ($\overline{\text{CTS}}$) 18-9 controls the transmitting circuits in the interface 18. When a "0" is applied to input 18-9 the transmitting circuits are enabled. However, since the portable terminal only receives data, this input is connected to ground potential. A request-to-send output ($\overline{\text{RTS}}$) 18-10 enables the microprocessor to control a peripheral device through the data bus. The output 18-10 is not utilized and is not connected to an output line. A data carrier detected input ($\overline{\text{DCD}}$) 18-11 provides for automatic control of the receiving end of a communications link. When a "1" is applied to the input 18-11, the receiver circuit of the interface is inhibited and initialized. A "0" to "1" transition initiates an interrupt request to the microprocessor to indicate the loss of the carrier. In this system, the DCD input 18-11 is not utilized and is connected to ground potential.

A transmit clock input (CTX) 18-12 is utilized for the clocking of transmitted data. The transmitter circuit of the interface 18 initiates data on a "1" to "0" transition of the signal applied to the input 18-12. This input is not utilized and is not connected to an input line. A receive clock input (CRX) 18-13 is connected to the line 38 of FIG. 3 to receive the clock out signal. The clock out signal and the data signal from the FM-SCA receiver and decoder 17 of FIG. 3 are synchronized. The receiver circuit strobes the incoming data out signal into the read only register in the interface 18 on the "0" to "1" transition of the clock out signal.

A transmit data output (TXD) 18-14 is utilized to transfer data to a peripheral device. Parallel data from the microprocessor is converted to serial data by the interface 18 before it can be outputted at the TXD output 18-14. Since the portable terminal does not transmit data the output 18-14 is not connected to an output line. A received data input (RXD) 18-15 is connected to the line 37 of FIG. 3 to receive the data out signal. The data is received in a serial format in synchronization with the clock out signal on the line 38. This data is stored in the read only register until the microprocessor 21 reads it in parallel form over the data bus 53.

The interface 27 is a model S6820 AMI peripheral interface adapter which provides the means for interfacing peripheral devices with the microprocessor 21. The interface has two sets of bidirectional lines for connection to peripheral devices with the capability of controlling each set independently and eight bidirectional data input/output terminals for communication with the microprocessor.

The interface 27 includes a pair of register select inputs (RS0 and RS1) which are utilized in conjunction with internal control registers to select a particular internal register that is to be written or read. The input (RS0) 27-1 is connected to the address bus 52 to receive the A0 address signal and the input (RS1) 27-2 is connected to receive the A1 address signal. A chip select input (CS0) 27-3 is connected to the address bus 52 to receive the A3 address signal, a chip select input (CS1) 27-4 is connected to receive the A14 address signal and a chip select input ($\overline{\text{CS2}}$) 27-5 is connected to receive the A15 address signal. When the A3 and A14 address signals are at "1" and the A15 address signal is at "0", the interface 27 is selected for data transfer under the control of enable and read/write signals from the microprocessor.

A group of eight bidirectional data terminals 27-6 are connected to the data bus 53. These terminals allow the transfer of the data signals D0 through D7 between the microprocessor and the interface. These terminals are maintained in the high impedance state except when the microprocessor performs a read operation by generating a R/W="1" signal. An E enable input 27-8 is connected to the control bus 54 to receive the VMA·P2="1" enable signal from the clock generator 51. The enable signal is the only timing signal which is applied to the interface 27. The timing of all other signals is referenced to the leading and trailing edges of the VMA·P2="1" pulse.

A reset input ($\overline{\text{RESET}}$) 27-8 is connected to the control bus 54 to receive the RESET signal. When RESET="0", all register bits in the interface 27 are set to "0". A read/write input (R/W) 27-9 is connected to the control bus 64 to receive the R/W signal from the microprocessor. When R/W="0", the interface input buffers are enabled and data can be transferred from the microprocessor to the interface 27 on the data bus 53 when the interface has been selected and the enable signal has been generated. When R/W="1", the interface output buffers are enabled and data can be transferred from the interface to the microprocessor when the interface has been selected and the enable signal has been generated.

A pair of interrupt request outputs ($\overline{IRQA}$ and $\overline{IRQB}$) are connected together to the control bus 54 to generate an IRQ interrupt request signal to the microprocessor. The $\overline{IRQA}$ output 27-10 and the $\overline{IRQB}$ output 27-11 each have two internal interrupt flag bits associated therewith which when set will generate an IRQ="0" signal. Each flag bit is also associated with a separate peripheral interrupt input line so that any one of four peripheral devices can generate an interrupt request signal. The interrupt is serviced by a microprocessor routine which sequentially reads and tests on a prioritized basis the interface for interrupt flag bits that are set. The flag bits are set to "0" when the microprocessor reads the data from the interface.

An interrupt input (CA1) 27-12 can be connected to a peripheral device to receive a "1" signal to set the interrupt flag bit associated therewith. This input is not utilized in this system and therefore is not connected to an input line. A peripheral control terminal (CA2) 27-13 is bidirectional. It can act as an interrupt input or a peripheral device control signal output, but is not utilized in this system and therefore is not connected to a line.

A plurality of section A data terminals (PA0-PA7) 27-14 are connected to the display circuit 26 of FIG. 7 to provide eight display data signals. Each of the data terminals can be programmed to function as an input or an output by setting a data direction register bit equal to "1" for an output and equal to a "0" for an input. During a microprocessor read operation, data on the terminals 27-14 appears on the corresponding data bus lines connected to the data terminals 27-6. In this system all the PA0-PA7 terminals are programmed as outputs. The microprocessor writes data into an A output register in the interface 27 which data will appear at the corresponding PA0-PA7 terminals 27-14 as the display data signals DD0-DD7. The terminals are connected to a plurality of parallel lines 61 which in turn are connected to inputs of the display circuit 26 of FIG. 7. A plurality of section B data terminals (PB0-PB7) 27-15 function in a manner similar to the PA0-PA7 terminals 27-14. Three of the terminals are programmed as outputs and are connected to the display circuit 26 of FIG. 7 by parallel lines 62 to generate the DC0 through DC2 data control signals from the microprocessor. The remaining terminals are not used and are connected to ground potential.

An interrupt input (CB1) 27-16 functions in a manner similar to the CA1 input 27-12. The CB1 input is not utilized in this system and therefore is not connected to an input line. A peripheral control terminal (CB2) 27-17 is similar to the CA2 terminal 27-13. It is programmed as a control signal output for the DC3 control signal and is connected to the display circuit 26 by a line 63.

The display interface circuit 25 is also a model S6820 AMI peripheral interface adapter. The interface 25 is connected to the address bus 52, the data bus 53 and the control bus 54 in the same manner as the interface 25 except that a chip select input (CS0) 25-3 is connected to the address bus 52 to receive the A2 address signal.

An interrupt input (CA1) 25-12 and a peripheral control terminal (CA2) 25-13, programmed as an input, are connected together to the keyboard circuit 24 of FIG. 6 by a line 64 to receive the keyboard strike interrupt (KSI) signal. A plurality of section A data terminals (PA0-PA7) 25-14 are connected to the column conductors of the keyboard circuit 24 by associated lines 65 for transferring the column switch signals CS0 through CS7. A plurality of section B data terminals are connected to the row conductors of the keyboard circuit by associated lines 66 for transferring the row switch signals RS0 through RS1. Since the data terminals can be programmed as inputs or outputs by the microprocessor 21, they are considered to be bidirectional in this system for sending data to and receiving data from the keyboard 24. The CB1 and CB2 terminals are not utilized in this system and are not connected to input or output lines.

Referring to FIG. 6, there is shown a schematic diagram of the keyboard circuit 24 of FIG. 2. The keyboard comprises an eight-by-eight matrix of single pole, single throw contact type switches for generating binary signals representing input data including letters and numbers or control signals. Although an eight-by-eight matrix is shown, a lesser number of rows and columns can be utilized. Each column of the matrix has one side of each of the eight switches in that column connected to one of the column switch signal lines 65 from the keyboard interface circuit 25 of FIG. 5. Each row of matrix has the other side of each of the eight switches in that row connected to one of the row switch signal lines 66 from the keyboard interface circuit 25. The side of each switch connected to a column switch signal line 65 is also connected to an input of a NAND 71 having an output 71-9 connected to the keyboard strike interrupt line 64 of the keyboard interface circuit 25. When a "0" is generated at any one or more of the inputs 71-1 through 71-8 of the NAND 71, a KSI="1" signal is generated at the output 71-9. If all of the inputs are at "1", a "0" will be generated.

The microprocessor 21, through the keyboard interface circuit 25, generates a "0" for all the row switch signals RS0 through RS7 on the row switch signal lines 66. When a key is depressed, a switch is closed to place the "0" signal on the associated column switch signal input to the NOR 71. For example, a switch 72 connected between the RS0 row and the CS0 column can be closed to generate a "0" at the input 71-1. The NOR 71 responds by generating a KSI="1" interrupt signal through the interface 25 to the microprocessor. The microprocessor then reads the column switch signals CS0 through CS7 through the interface 25 and stores them as the column address of the closed switch. The microprocessor then generates the just read column switch signals back through the interface 25 and onto the lines 66 before the switch 71 can open. Now the microprocessor reads the row switch signals RS0 through RS7 through the interface 25 and stores them as the row address of the closed switch. The column and row addresses will then identify the switch 72 as the switch that was closed and the microprocessor can determine what function or information is represented by the switch by reading data stored in one of the ROM's 23.

Referring to FIG. 7, there is shown a part block diagram and part schematic of a portion of the display circuit 26 of FIG. 2. The display 26 includes four liquid crystal display elements with the associated circuitry for driving them. Inputs to the display 26 are the display data signals DD0 through DD7 on the lines 61, the display control signals DC0 through DC2 on the lines 62 and the display control signal DC3 on the line 63 all from the display interface circuit 27. Outputs from the display circuit 26 are in the form of lighted symbols representing output data generated by the microprocessor in response to the keyboard inputs and the data received from the broadcasting station.

The display control signals DC0 through DC3 are inputs to a type number CD4028A binary coded decimal-to-decimal decoder 81 manufactured by the RCA Solid State Division, Box 3200, Somerville, N.J. 08876. The decoder 81 includes four inputs, an "A" input 81-1 connected to receive the DC2 signal, a "B" input 81-2 connected to receive the DC0 signal, a "C" input 81-3 connected to receive the DC1 signal and a "D" input 81-4 connected to receive the DC3 signal. For any combination of "0" and "1" signals at the inputs, the decoder 81 will generate a "1" at a selected one of ten outputs while the remainder of the outputs are at "0". The "A" input 81-1 represents the binary one position and the "D" input represents the binary eight position such that when all the inputs are at "0", a "1" is generated at an output 81-5 and when the combination of input signals represents nine or greater, a "1" is generated at an output 81-14.

The decoder 81 is utilized to selectively enable eight pairs of four segment liquid crystal display drivers, two pairs of drivers for each display element in the display circuit. In FIG. 7 there are shown four drivers, 82 through 85, connected to receive the display data signals on the lines 61. The drivers can be type number CD4054A manufactured by RCA. Each of the lines 61 is connected to a driver input through a buffer, such as a buffer 86 connected to an input 81-1. The buffers are utilized as current drivers for the display circuitry. The buffers can be type number CD4010A manufactured by RCA.

The driver 82 receives the DD0 signal at the input 82-1, the DD1 signal at an input 82-2, the DD2 signal at an input 82-3 and the DD3 signal at an input 82-4. Each of the driver circuits has an input associated with an output, such as the inputs 82-1 through 82-4 associated with the outputs 82-5 through 82-8 respectively. Each of the circuits also has a strobe or clock input (C). When there is a "0" at the clock (C) input, the data at the input is latched at the outputs and cannot be changed until a "1" is generated at the clock input. When there is a "1" at the clock input, data at the inputs is transferred to the outputs. In FIG. 7, the four clock (C) inputs for each driver are connected together to one of the outputs of the decoder 81. For example, the clock inputs 82-9 are connected to the decoder output 81-5.

The drivers also have the capability of generating a level-shifted, high amplitude display frequency signal at any output when the corresponding input is at "0" and the corresponding clock input is at "1". As shown in FIG. 7, a refresh clock generator 87 can be conventional high frequency square wave generator for generating a square wave pulse train. The generator 87 is connected to the display frequency (DF) input of each of the drivers through a buffer 88. If the decoder 81 receives display control signals representing zero, a "1" will be generated at the output 81-5 and the driver 82 will have DC0 through DC3 signals latched at its outputs. If any one of DC0 through DC3 signals is "0", the display frequency pulse train at a DF input 82-10 will generate a square wave output signal at the same frequency as the display frequency pulse train.

The outputs 82-5 through 82-8 of the driver 82 are connected to four inputs 89-0 through 89-3 respectively of a liquid crystal display element 89. The display element 89 has sixteen inputs, 89-0 through 89-15, associated with liquid crystal segments and a back plane input 89-16. The back plane input 89-16 is connected to the refresh clock generator 87 through a buffer 91 for receiving the display frequency pulse train.

Since the data bus 53 is only 8 bits wide, the microprocessor must send the sixteen bits of information for each display element in two groups, one group for the left half of the element and the other group for the right half. The first group of DD0 through DD7 display data signals is generated at the inputs of the drivers 82 and 83. The clock inputs 82-9 and 83-9 are connected to the decoder output 81-5. The microprocessor generates the DC0 through DC3 zero address and the display data is latched onto the outputs of the drivers 82 and 83. Those display data signals which are at "0" will produce a DF output signal which activates the corresponding display segment. The outputs of the drivers are connected to the right half of the display element.

The display element 89 can be a model DL-416 alphanumeric sixteen segment star pattern display manufactured by Litronix, Inc, 19000 Homestead Road, Vallco Park, Cupertino, Calif. 95014. When the DF output signal is applied to the selected segment and the pulse train from the generator is applied to the back plane, an electric field is generated and the liquid crystal material becomes turbulent and scatters light. This scattering effect appears as an optically dense area in the shape of the segment. Therefore, when the drivers 82 and 83 are latched, the right half of the display element 89 is driven. Now the microprocessor generates the second group of DD0 through DD7 signals and latches them into the drivers 84 and 85 to drive the left half of the display element 89.

Although not shown in FIG. 7, there are three more display elements similar to the element 89. Each element is associated with four drivers which have inputs connected to the lines 61. As indicated, the second display element drivers are connected to the decoder outputs 81-7 and 81-8, the third display element drivers are connected to the decoder outputs 81-9 and 81-10 and the fourth display element drivers are connected to the decoder outputs 81-11 and 81-12. The DC2 signal at the decoder input 81-1 is utilized to select which half of the display element is to be driven. When DC2="0", a "1" will be generated at an odd numbered output and when DC2="1", a "1" will be generated at an even numbered output of the decoder 81. Therefore, the clock (C) inputs of the drivers for the right halves are connected to the odd numbered outputs and the clock (C) inputs of the drivers for the left halves are connected to the even numbered outputs. The DC0 and DC1 signals provide four address combinations, one for each of the display elements. The DC3 signal provides a control for enabling the decoder 81. If DC3="1", all of the outputs 81-5 through 81-12 will be at "0". If DC3="0", any one of those outputs can be addressed with the DC0 through DC2 signals.

In summary, the information broadcasting system according to the present invention includes a transmitting station for encoding and transmitting in serial form data received from an information source and at least one portable terminal for receiving and decoding the data. The encoded data is used to phase modulate a FM carrier at three times the stereo pilot frequency to generate a series of binary bits. The objective of the encoding is to secure the transmitted data from unauthorized access and to limit the use of the portable terminal to prepaid periods. Each portable terminal has one of 65,536 binary sixteen bit terminal identification (ID) numbers stored therein. A unique password that is different for each terminal and each pay period is entered into the terminal utilizing the keyboard. The terminal ID number and the password are combined to generate a keyword which is unique for the pay period but is the same for all terminals. The keyword is then directly or indirectly utilized to decode information necessary to translate the input data into a form which can be processed to generate the desired output data.

In one encoding scheme, the terminal ID number is exclusive-OR'ed with the corresponding bits of the user entered sixteen-bit password. An exclusive-OR'ed logic operation generates a true output signal if the inputs are logically different and a false output signal if the inputs are logically the same. The exclusive-OR'ed ID number and password generate a keyword which is utilized to decode the incoming data. The keyword is exclusive-OR'ed with the incoming data word of 8 bits plus the previously received data word to generate a new data word. Periodically, the incoming data will be an all 0 bits synchronizing character which synchronizes the keyword with the incoming data. The keyword is rotated by 1 bit for each incoming data word so that it repeats every sixteen data words. Although the relationship between the terminal ID number and the password will remain the same from pay period to pay period, it is relatively difficult to break the encoding scheme.

In a second encoding scheme, a pseudo random number generator is utilized to make the encoding scheme more difficult to break. The generator creates a string of random numbers which are a direct function of an initializing seed number. Although the random numbers are repeatable from a given seed, the pattern will not repeat for at least 16,000,000 numbers.

The user entered password is used to seed the random number generator to generate a number which is exclusive-OR'ed with the terminal ID number to generate the keyword. By utilizing a random number generator, it is possible to have 16,000,000 different passwords which minimizes the possibliity of a relationship between the terminal ID number and the password being discovered. The keyword is exclusive-OR'ed with the incoming data before a test is made for the synchronization word. This prevents the discovery of the sync word since it will change from pay period to pay period.

Data that immediately follows the sync word is used to seed the random number generator. The number from the generator is then exclusive-OR'ed with the incoming data to decode it. This allows the encoder at the transmitter to dynamically change the encoding scheme from refresh cycle to refresh cycle. The fact that the sync word changes from pay period to pay period and the encoding scheme changes from refresh cycle to refresh cycle makes the transmitted data appear as a continuous stream of random binary bits.

The portable terminal includes a receiver means for receiving and decoding the encoded data, a receiver interface for converting the decoded data from serial to parallel form, a processing means for reading the data in parallel form and performing arithmetic and logic operations on the data to generate output data in parallel form, a display means for displaying the output data and a bus means connecting the receiver interface means and the display means to the processing means.

The transmitting station can include a digital computer which receives data from various sources and encodes the data as binary bits. The encoded data is transmitted by phase shift modulating a FM-SCA carrier wave at a predetermined frequency. The receiver includes a tuned amplifier means for separating the predetermined frequency phase shifted modulation signal from the FM-SCA carrier wave, a converter responsive to the modulation signal for generating a binary coded phase shifted data signal representing the encoded data and a decoder means responsive to the data signal for generating a binary coded data out signal in serial form representing the encoded data to the receiver interface means. Typically, the FM-SCA carrier wave is phase shift modulated at three times the FM stereo pilot signal frequency. The receiver also includes a tuned amplifier means for separating the stereo pilot signal from the FM-SCA carrier wave, a phase shifter means for adjusting the phase of the stereo pilot signal relative to the modulation signal and a converter means responsive to the stereo pilot signal for generating a square wave clock pulse train. The decoder means is responsive to the binary coded phase shifted data signal and the clock pulse train for generating the binary coded data out signal.

The processing means includes a microprocessor having a plurality of address signal outputs and a plurality of data signal bidirectional terminals. The microprocessor is responsive to instruction signals at the data signal terminals for performing arithmetic and logic operations on the data to generate output data signals at the data signal terminals and address signals at the address signal outputs. The processor also includes at least one read only memory having a plurality of address signal inputs and a plurality of data signal outputs. The read only memory stores program instructions and is responsive to the microprocessor generated address signals at the address signal inputs for generating instruction signals at the data signal outputs. The bus means includes an address bus for connecting the microprocessor address signal outputs and the read only memory address signal inputs. The bus means also includes a data bus for connecting the microprocessor data signal terminals to said read only memory data signal outputs for transferring the instruction signals.

The receiver interface means receives the data as binary coded bits in serial form, stores the bits and generates a data signal from each of the bits. The receiver interface means has a plurality of data signal outputs connected to the data bus and is responsive to the storage of a predetermined number of the bits for generating an interrupt signal. The microprocessor responds to the interrupt signal by reading the data signals from the receiver interface data signal outputs over the data bus.

The display means includes a display interface means having a plurality of data signal inputs connected to the data signal bus for receiving the data output signals and is responsive thereto for generating display data signals. The display means also includes at least one display element responsive to the display data signals for converting the output data signals from binary coded form to alpha-numeric form. The display interface means can also be responsive to the output data signals for generating display control signals. The display means also includes a decoder means responsive to the display control signals for generating a clock signal and driver means responsive to the clock signal and the display data signals for generating at least one segment driver signal. The display element is responsive to the segment driver signal for displaying the output data signals in alpha-numeric form.

The operation of the information transmitting system according to the present invention will now be discussed with the aid of the flow diagrams of FIGS. 8 through 12. The following symbols are utilized in the flow diagrams:

1. An oval (see 101 of FIG. 8) - identifies the beginning and end of a routine or subroutine.
2. A rectangle (see 102 of FIG. 8) - identifies a processing function in the form of one or more steps.
3. A diamond (see 104 of FIG. 8) - identifies a decision function.
4. A rhomboid (see 125 of FIG. 9) - identifies an input or output function.

Figure 8:
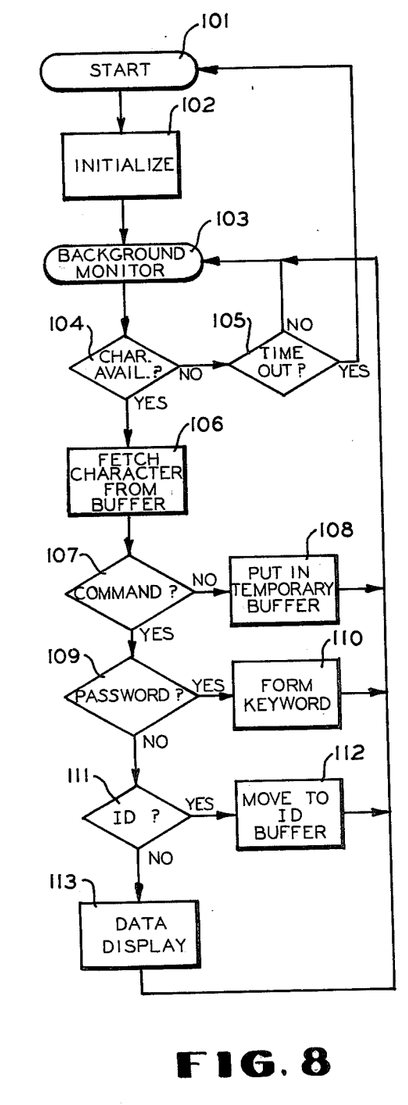
FIGS. 8 through 12 are flow diagrams of the routines for operating the portable terminal of FIGS. 1 through 7.
Figure 9:
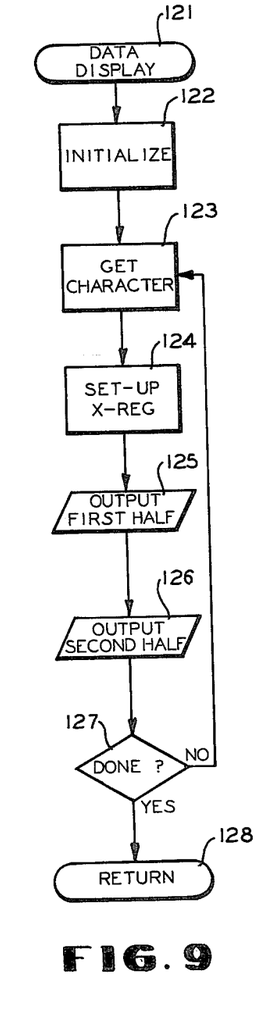
Figure 10:
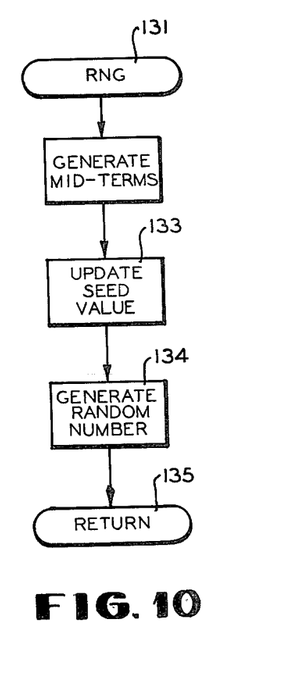
Figure 11:
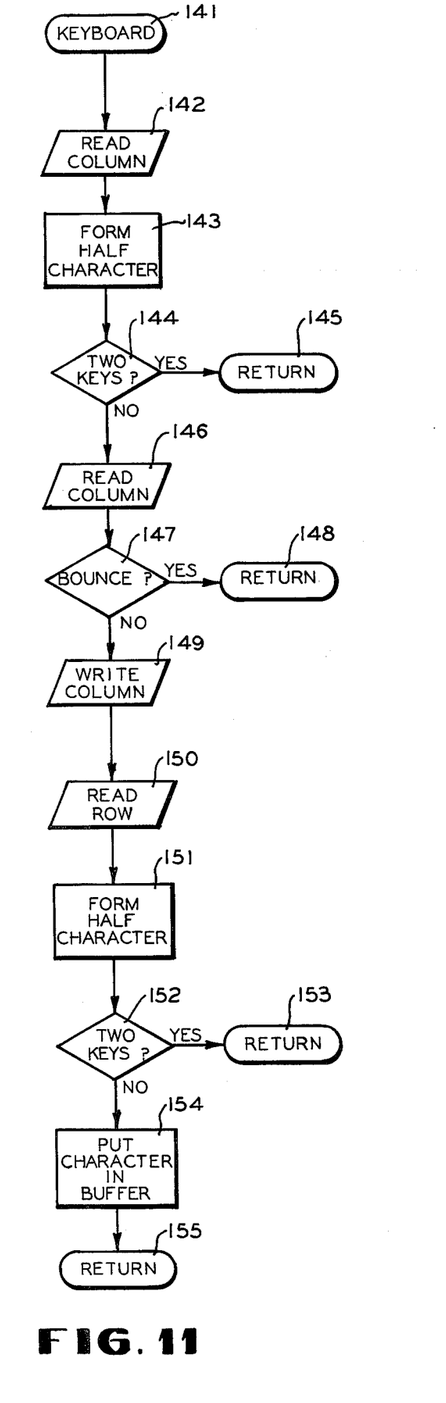
Figure 12:
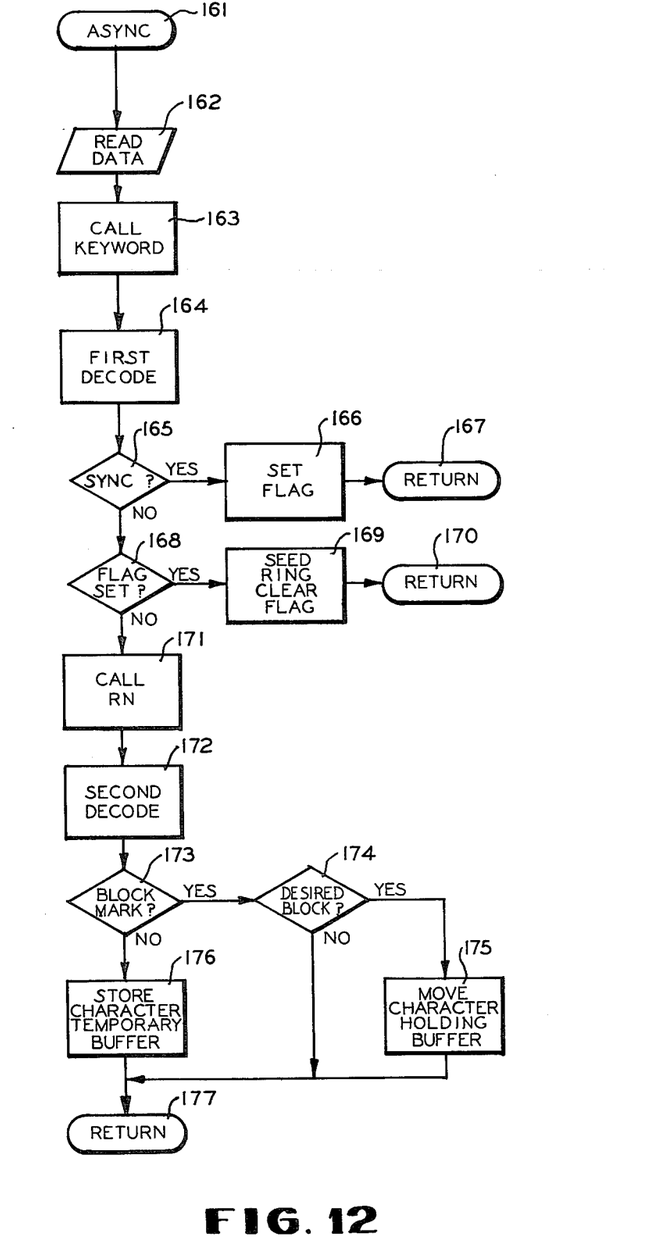

FIG. 8 is a flow diagram of the background monitor routine of the portable terminal which coordinates the interrupt driven input routines for the received data FIG. 12 and the keyboard FIG. 11, the display subroutine FIG. 9 and the random number generator subroutine FIG. 10. When power is applied to the circuits of the portable terminal, the restart logic circuit 51 of FIG. 5 generates a RESET = "1" signal to the microprocessor 21 to begin a restart sequence as previously described. The microprocessor starts at a "Start" routine identification 101 and enters as "Initialize" processing function 102 comprising a series of instructions for setting initial conditions in the microprocessor 21, the RAM 23, the receiver interface circuit 18, the keyboard interface circuit 25 and the display interface circuit 27.

After the circuits have been intialized, a loop identified by the "Background Monitor" routine identification 103 is entered. This routine directs the microprocessor to scan the input buffer in the RAM 23 for data from the receiver or the keyboard. A decision function instruction "Char. Avail.?" 104 checks the input buffer for a data word or character. If no character has been stored, the routine branches at "No" and a decision function instruction "Time Out?" 105 checks the elapsed time since the "Background Monitor" routine was entered. If a predetermined amount time has not elapsed, the routine will branch at "No" and keep looping until a character is entered into the input buffer. If the time has elapsed, the routine will branch at "Yes" from "Time Out?" and return to "Start" 101 before turning off the power. This will protect against a situation where the authorized user has left his activated portable terminal which is subsequently found by an unauthorized person.

If there is a character in the input buffer, a "Fetch Character From Buffer" processing function 106 is executed and a check is made to see if the character is a "Command?" at a decision function instruction 107. If the character is not a command from the keyboard, but is data, the routine branches at "No" and the character is "Put in Temporary Buffer" by a processing function instruction 108. Then the routine returns to "Background Monitor" 103 to search for another character. If the character is a command, the routine branches at "Yes" and a check is made by a "Password" decision function instruction 109 to see if the character is a password.

If the character is a password, the routine branches at "Yes" and a keyword is formed by a "Form Keyword" processing function instruction 110 representing a series of instructions directing the microprocessor to form the keyword from the password and the identification number. Then the routine returns to "Background Monitor" 103 to search for a new character. If the character is not a password, the routine branches at "No" to check for an identification character with an "ID?" decision function instruction 111. An ID is a keyboard entered request for information to be displayed. If the character is an "ID" character it is placed in the ID buffer by a "Move To ID Buffer" processing function instruction 112. If the character is not an identification character it is a data character and the routine branches at "No" wherein the data is displayed by a "Data Display" processing function routine 113 which is shown in more detail in FIG. 9. After the "Data Display" routine is finished, the program will return to "Background Monitor" 103 to enter the loop once again.

The microprocessor continues to loop through the "Background Monitor" routine subject only to interrupts from the Keyboard FIG. 11 and Asynch FIG. 12 input routines. When one of the switches in the keyboard 24 of FIG. 6 is closed, the NOR 71 generates an interrupt signal to the keyboard interface circuit 25 of FIG. 5. The interface 25 responds by generating an IRQ interrupt signal to the microprocessor 21 through the control bus 54. The microprocessor completes the current instruction of the "Background Monitor" routine and shifts to a "Keyboard" routine identification 141 to begin a sequence of instructions that will identify and store the character represented by the closed switch.

A "Read Column" input function instruction 142 directs the microprocessor to read the column switch signals CSO through CS7 through the interface 25. These signals are utilized to identify the column location half of the character according to a "Form Half Character" processing function instruction 143. A "Two Keys?" decision function instruction 144 checks for multiple switch closures. If more than one column has a keyboard switch closed, the routine branches at "Yes" and a "Return" identification 145 directs the microprocessor to return to the point in the "Background Monitor" routine following the last completed instruction.

If only one column has a keyboard switch closed, the column switch signals are again read by a "Read Column" input function instruction 146 to test for contact bounce. A "Bounce?" decision function instruction 147 compares the two sets of column switch signals. If there is contact bounce, the signals will be different and the routine will branch at "Yes". A "Return" identification 148 will direct the microprocessor back to the "Background Monitor" routine. If there is no contact bounce, the routine will branch at "No" to a "Write Column" output function instruction 149. The microprocessor is directed to place a "1" on the active column and a "0" on each inactive column of the keyboard matrix.

Now a "Read Row" input function instruction 150 directs the microprocessor to read the row switch signals RSO through RS7. These signal are utilized to identify the row location half of the character according to a "Form Half Character" processing function instruction 151. A "Two Keys?" decision function instruction 152 checks for multiple switch closures. If more than one row has a keyboard switch closed, the routine branches at "Yes" and a "Return" identification 163 directs the microprocessor to return to the "Background Monitor" routine.

If only one row has a keyboard switch closed, the routine branches at "No". A "Put Character In Buffer" processing function instruction 154 directs the microprocessor to store the character in the input buffer. A "Return" identification 155 then returns the microprocessor to the "Background Monitor" routine where the stored character is read from the buffer according to the "Fetch Character From Buffer" processing function instruction 106 as the microprocessor loops through the routine.

When data has been assembled in the receiver interface circuit 18, an IQR interrupt signal is sent to the microprocessor 21 through the control bus 54. The microprocessor completes the current instruction of the "Background Monitor" routine and shifts to an "Async" routine identification 161 to begin a sequence of instructions that will read, decode and store the incoming data.

A "Read Data" input function instruction 162 directs the microprocessor to read the D0 through D7 data signals through the data bus 53. Next, the keyword, which was formed by the instruction 110 of FIG. 8, is called from storage by a "Call Keyword" processing function instruction 163. The data and the keyword are exclusive-OR'ed as directed by a "First Decode" processing function instruction 164. If the result is zero, a "Sync?" decision function instruction 165 will branch the routine at "Yes" and a "Set Flag" processing function instruction 166 will direct that a sync flag be set. Then a "Return" identification 167 will return the microprocessor to the "Background Monitor" routine.

If the result of the "First Decode" 164 is not zero, a "Flag Set?" decision function instruction 168 checks to see if the sync flag is set. If the flag is set indicating that a sync character has been received, the routine branches at "Yes" and a "Seed RNG Clear Flag" processing function instruction 169 seeds the random number generator with the new data and the sync flag is cleared. Then a "Return" identification 170 directs the microprocessor to return to the "Background Monitor" routine.

If the sync flag is not set, the routine branches at "No" to a "Call RN" processing function instruction 171 which directs the microprocessor to the random number routine of FIG. 10. The random number routine begins at a "RNG" identification 131. A "Generate Mid-terms" processing function instruction 132 directs the microprocessor to utilize a shift and add type of logic to generate temporary mid-terms from the seed data. Then the microprocessor will utilize the mid-terms to update the seed value as directed by an "Update Seed Value" processing function instruction 133. Next the microprocessor will utilize the mid-terms to generate a random number as directed by a "Generate Random Number" processing function instruction 134. A "Return" identification will direct the microprocessor to return to the "Async" routine.

A "Second Decode" processing function instruction 172 directs the microprocessor to exclusive-OR the data with the random number. If the result is not zero, a "Block Mark?" decision function instruction 173 will branch the routine at "No". A "Store Character In Buffer" processing function instruction 176 will direct the microprocessor to store the character in a temporary buffer. Then a "Return" identification 177 will return the microprocessor to the "Background Monitor" routine. If the result of the "Block Mark?" instruction is zero, the routine will branch at "Yes". A "Desired Block?" decision function instruction 174 will check to see if the block mark identifies a desired block of data by comparing the block mark with the stored ID in the ID buffer. If it is not the desired block, the routine branches at "No" to the "Return" identification 177. If it is the desired block, the character stored in the temporary buffer by the instruction 176 is moved to a holding buffer as directed by a "Move Character" processing function instruction 175. Then the routine directs the microprocessor to the "Return" identification 177 to return to the main loop.

The data display routine shown in FIG. 9 starts at a "Data Display" routine identification 121. An "Intialize" processing function instruction 122 directs the microprocessor to clear previously generated display data and control signals from a buffer in the RAM. Then a "Get Character" processing function instruction 123 directs the microprocessor to fetch a character to be displayed from the holding buffer. A "Set-Up X-Reg" processing function instruction 124 directs the microprocessor to obtain the correct display data signals from a lookup table stored in a ROM.

Now the character is ready to be displayed. The first eight display data signals for the first half of the character are generated to the display circuit under the control of an "Output First Half" output function instruction 125. The second eight display data signals are generated under the direction of an "Output Second Half" output function instruction 126. A "Done?" decision function instruction 127 checks to see if all the desired data has been displayed. If the display of the character involves more than one of the display elements, the routine will branch at "No" and return to the "Get Character" instruction 123 to loop through the output instructions. When the character display is complete, the routine will branch at "Yes" and a "Return" identification 128 will direct the processor to return to the main loop.

In summary, the present invention provides a secure information broadcasting system including a portable terminal for receiving and displaying data. A subscriber entered password and stored identification number generate a keyword for decoding the data which is selected for displaying by entering commands via a keyboard. The terminal can be powered by batteries so that it can be operated anywhere within receiving range of a central transmitting station.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. An information broadcasting system including a transmitting station for encoding and transmitting in serial form data received from an information source by modulating a carrier wave with the encoded data and at least one portable terminal for receiving and decoding the encoded data, said portable terminal comprising:

receiver means for receiving and demodulating the encoded data from the carrier wave;

receiver interface means connected to said receiver means for converting the encoded data from serial to parallel form;

programmed processing means connected to said receiver interface means for reading the encoded data in parallel form, decoding the encoded data in response to a password, and selecting a portion of the decoded data and performing arithmetic and logic operations on the selected data in response to a request for information to be displayed to generate output data in parallel form representing the selected data;

keyboard means for entering said password and said request for information;

display means for displaying said output data; and bus means connecting said keyboard means and said display means to said processing means.

2. A system according to claim 1 wherein the transmittimg stations encodes the data and phase shift modulates a FM-SCA carrier wave at a predetermined frequency and wherein said receiver means includes a tuned amplifier means for separating said predetermined frequency phase shifted modulation signal from said FM-SCA carrier wave, a converter means responsive to said modulation signal for generating a binary coded phase shifted data signal representing the encoded data and a decoder means responsive to said binary coded phase shifted data signal for generating a binary coded data out signal in serial form representing the encoded data to said receiver interface means.

3. A system according to claim 2 wherein said FM-SCA carrier wave is phase shift modulated at three times the FM stereo pilot frequency.

4. A system according to claim 2 wherein said receiver means includes a tuned amplifier means for separating a stereo pilot signal from said FM-SCA carrier wave, a phase shifter means for adjusting the phase of said stereo pilot signal relative to said modulation signal, and a converter means responsive to said stereo pilot signal for generating a square wave clock pulse train wherein said decoder means is responsive to said binary coded phase shifted data signal and said clock pulse train for generating said binary coded data out signal.

5. A system according to claim 1 wherein said processing means includes a microprocessor having a plurality of address signal outputs and a plurality of data signal bidirectional terminals, said microprocessor being responsive to instruction signals at said data signal terminals for performing arithmetic and logic operations on the data to generate output data signals at said data signal terminals and address signals at said address signal outputs, and at least one read only memory having a plurality of address signal inputs and a plurality of data signal outputs, said read only memory storing program instructions and being responsive to said address signals at said address signal inputs for generating instruction signals at said data signal outputs, and wherein said bus means includes an address bus for connecting said microprocessor address signal outputs to said read only memory address signal inputs and a data bus for connecting said microprocessor data signal terminals to said read only memory data signal outputs.

6. A system according to claim 5 wherein said receiver means generates the data as binary coded bits in serial form, said receiver interface means stores said bits and generates a data signal from each of said bits, said receiver interface means is responsive to the storage of a predetermined number of said bits for generating an interrupt signal, said receiver interface means has a plurality of data signal outputs connected to said data signal bus and said microprocessor responds to said interrupt signal by reading said data signals over said data bus.

7. A system according to claim 5 wherein said display means includes a display interface means having a plurality of data signal inputs connected to said data signal bus for receiving said output data signals, said display interface means responsive to said output data signals for generating display data signals, and includes at least one display element responsive to said display data signals for converting said output data signals from binary coded form to alpha-numeric form.

8. A system according to claim 1 wherein said display means includes a display interface means connected to said bus means and responsive to said output data signals for generating a plurality of display data signals and display control signals, decoder means responsive to said display control signals for generating a clock signal, driver means responsive to said clock signal and said display data signals for generating at least one segment driver signal and at least one display element responsive to said segment driver signal for displaying said output data signals in alpha-numeric form.

* * * * *